Nov. 12, 1940. M. FREUND Re. 21,621

WIRE SPRING FOR CUSHIONED SEATS

Original Filed Aug. 14, 1935 2 Sheets-Sheet 1

INVENTOR

BY MORRIS FREUND

Gustav. A. Wolff.

ATTORNEY

Nov. 12, 1940. M. FREUND Re. 21,621

WIRE SPRING FOR CUSHIONED SEATS

Original Filed Aug. 14, 1935 2 Sheets-Sheet 2

INVENTOR
BY MORRIS FREUND
Gustav. Q. Wolff.
ATTORNEY

Reissued Nov. 12, 1940

Re. 21,621

UNITED STATES PATENT OFFICE 21,621

WIRE SPRING FOR CUSHIONED SEATS

Morris Freund, Cleveland, Ohio, assignor, by direct and mesne assignments, to John C. Lincoln, Scottsdale, Ariz.

Original No. 2,047,411, dated July 14, 1936, Serial No. 36,175, August 14, 1935. Application for reissue May 16, 1938, Serial No. 209,387

14 Claims. (Cl. 155—179)

This invention relates to flat springs of sinuous or similar shape now generally used for the backs of seats, flat cushions and the like. Flat springs of the type referred to offer little resistance to bending stresses and therefore cannot be used for the seats of upholstered furniture, cushioned automobile seats and the like, as heavier loads bend these springs beyond the desired limit and effect stretching of the springs followed by a decrease of resiliency. It has been proposed to eliminate this defect of this type of flat springs by giving the springs a permanent set on an arc of greater curvature than these springs assume, when in use. However this method, though increasing the resiliency of the springs is insufficient to overcome the above defects of flat springs when under heavier loads, as any presetting of these springs is limited, and as the increased resiliency obtained by presetting the springs does not warrant the increase in expense for assembling cushioned goods with preset flat springs.

The primary object of the present invention is the provision of a flat spring of the type referred to with means for resiliently counteracting bending of these springs proportionate to their loads, so as to retain the advantages of flat springs under small or heavy loads, while avoiding the disadvantages under heavy loads.

Another object of the invention is the provision of a flat spring of the type referred to with yielding means arranged at the opposite ends of the spring for resiliently counteracting bending and longitudinal tilting of the spring proportionate to the load carried thereby.

A further object of the invention is the provision of a flat spring of the type referred to with yielding means at its opposite ends arranged at substantially a right angle to the longitudinal axis of the spring for yieldingly counteracting bending and longitudinally tilting of the spring proportionate to the load carried thereby.

Still another object of the invention is the provision of a flat spring of the type referred to with a plurality of yielding means at its ends and in definite areas between its ends for resiliently counteracting bending of the spring proportionate to the load and near the load, so as to permit of the use of flat springs of substantial length without the defects of common flat springs of the type referred to.

In addition the invention has certain other marked superiorities which radically distinguish it from the presently known structures above referred to. These improvements or superior characteristics embodying certain novel features of construction are clearly set forth in the following specification and the appended claims; and a preferred form of embodiment of the invention is hereinafter shown with reference to the accompanying drawings forming part of the specification.

Figure 1:
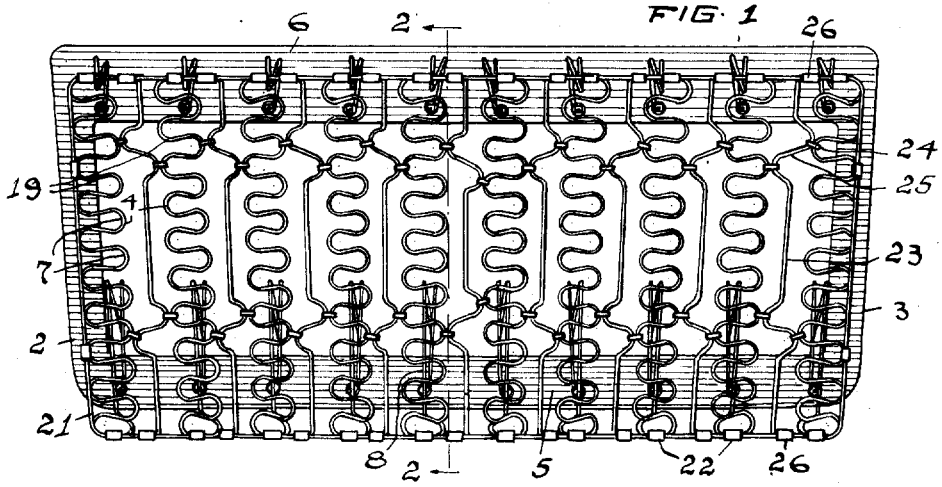
Figure 1 shows a spring base of a cushioned automobile seat embodying flat springs according to the invention.
Figure 2:
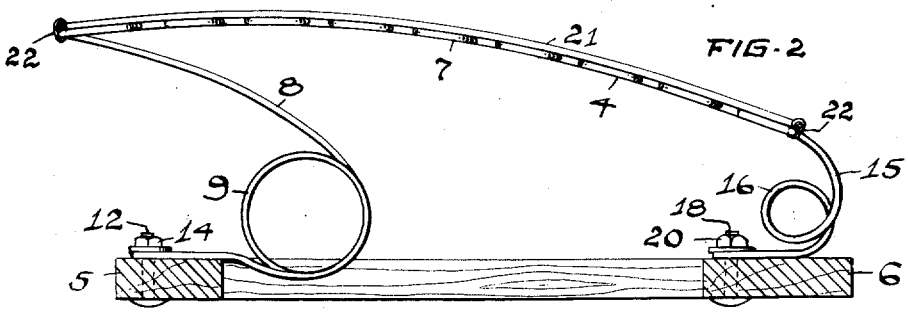
Figure 2 is an enlarged cross sectional view through the spring base shown in Fig. 1, the section being taken on line 2—2 of Fig. 1.

Referring more particularly to the drawings, reference numeral 2 represents a spring base member of a cushioned automobile seat, which member embodies an elongated frame 3, supporting a plurality of flat sinuous springs 4. These springs, which are arranged crosswise of the frame 3 and secured to the front and rear rails 5 and 6 thereof, as will be later described, are made of steel wire, bent to sinuous shape, so that the loops 7 of the springs extend substantially parallel to each other and permit longitudinal extension and or compression of the springs under load. The front end of each spring 4 is formed with an integral rearwardly and downwardly extended lever arm 8, which arm is looped at its free end to provide a spring coil 9, arranged in a plane substantially rectangular to the plane of the flat spring 4. The free end 10 of the coil 9 extends laterally and outwardly from the coil and is hook-shaped at its end to permit of fastening of the end 10 to the front rail 5 of frame 3, when a bolt 12 in rail 5 is extended through the hook-shaped end 10 and a nut 14 on bolt 12 is screwed home. The rear end of each spring 4 is formed with a rearwardly and downwardly extended integral lever arm 15, which arm is coiled at 16 and provided with a hook-shaped end 17, so as to permit its fastening to the rear rail 6 of the frame 3, when a bolt 18 in rail 6 is sleeved through the hook-shaped end 17 and a nut 20 on bolt 18 is screwed home.

The fact that the lever arm 8 at the front end of the spring 4 is substantially longer than the lever arm 15 at the rear end of the spring, and the fact that the coil 9 is substantially larger than the coil 16 insure proper yielding of the front end of the spring 4 under load, causes a yieldingly increasing resistance of the spring 4 against downward deflection under load, so that the acute danger of deformation of the flat spring is completely avoided. When subjected to loads, the lever arms 8 and 15, which arms are extended rearwardly and downwardly, together with their coils 9 and 16 effect a slight forward movement of the spring 4. However, as the lever arm 15 and its coil 16 offer more resistance against this forward movement of the spring than the lever arm 8 and its coil 9, the forward movement effects a tension in the sinuous loops 7 of the spring 4, which tension is proportionate to the forward movement of the spring and therewith proportionate to the load on the spring. Such tensioning of the loops 7 therefore effects an increase in the stability of the spring against deflection, which increase in stability is proportionate to the load carried by the spring.

Figure 3:
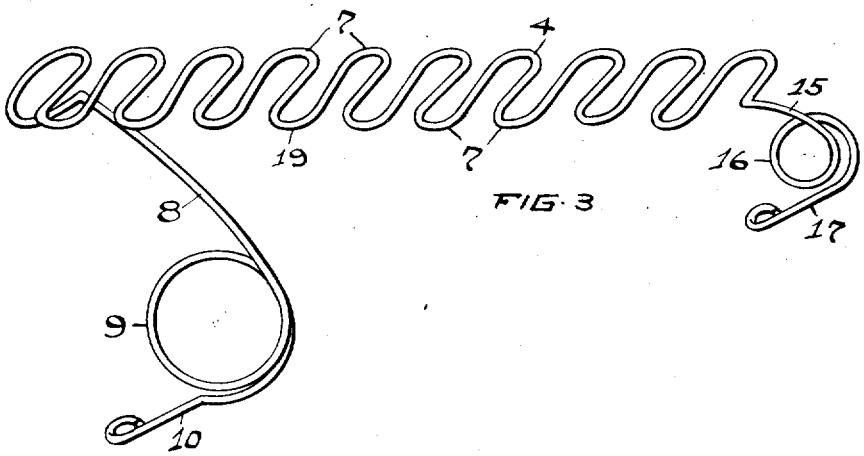
Figure 3 is a perspective view of a flat spring according to the invention.
Figure 4:
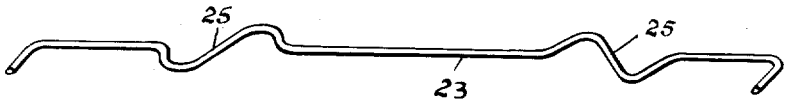
Figure 4 is a perspective view of one of the tying members, used for tying the springs with each other, when assembled in a base such as shown in Fig. 1.

In addition coils 9 and 16 of the spring 4 are tensioned during assembly of the spring on the frame 3. Thus the hook-shaped ends 18 and 17 of these coils extend at an angle to the plane of the sinuous portion 19 of the spring 4, see Figure 3, and when springs 4 are secured to the base member 3 and therewith the ends 18 and 17 brought into a plane more nearly parallel to the sinuous portion of the spring, the loops 7 of the mounted springs possess an initial tension, which tension increases the stability of the flat portion of each spring against deflection.

The springs 4, which are crosswise placed in the frame 3 as described above, support at their ends an edge wire 21, secured thereto by means of clips 22. These clips are fastened to the loops at the opposite ends of the sinuous portions of the springs, which portions are also connected to each other by means of wire tie members 23, clips 24 being used for this purpose. The clips 24 connect the curved portions 25 and tie members 23 with the loops 7 of springs 4 and the tie members in turn are pivotally connected to the wire 21 by means of clips 26.

The thus tied springs 4 form a resilient seating surface, which can readily be padded and covered with cloth or the like, all as customary in the art.

Should it be desirable to make the seating surface more resilient, then the tie members 22 can be omitted and the sinuous portions 19 of the springs 4 can be tied to each other by means of short spiral springs.

Figure 5:
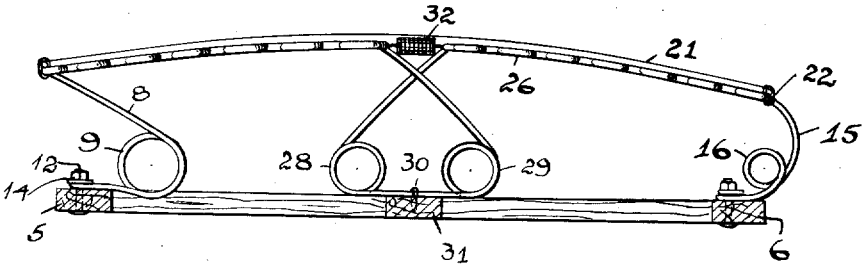
Figure 5 is a cross sectional view similar to Fig. 2, through a spring base embodying a somewhat modified form of flat springs according to the invention.
Figure 6:
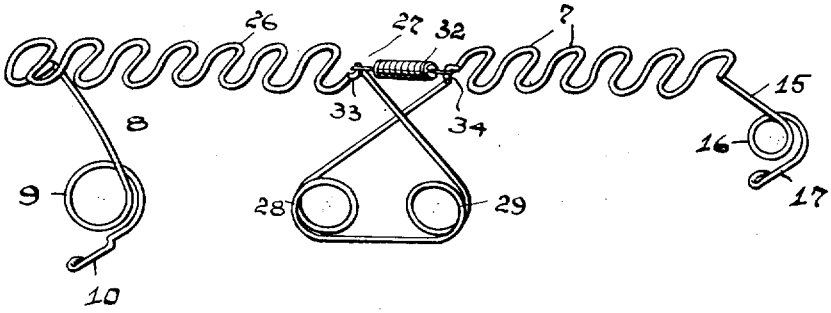
Figure 6 is a perspective view of the modified form of the flat spring shown in Fig. 5.

In some cases, particularly for larger seats, such as present in davenports etc. it is desirable to subdivide the length of the flat springs in shorter sections, in order to avoid too long sinuous portions in the spring, as too long sinuous portions might possibly be deflected downwardly to such a degree that a deformation of the spring occurs. Such a construction is shown in Figs. 5 and 6. In this structure the front and rear ends of the spring 26 are built similar to the structure shown in Fig. 3, however, spring 26 is subdivided at 27, that is the wire of the spring is at 26 bent downwardly, then looped at 28 and 29, and finally bent upwardly to continue to form the sinuous loops 7 to the end of the sinuous portion of the spring. When fastened to the base member a staple 30 is utilized for securing the wire of the spring between the loops 28 and 29 to the middle rail of the frame 31. Such a formation or construction of the spring 26 provides an additional support between the opposite ends of the spring and insures proper stability of long flat springs against undesired deflections. The two subdivisions of the sinuous portion of the spring 26 are preferably tied together by means of a short, stiff coiled spring 32, which is secured to the slightly curved portions 33, 34 respectively of the two subdivisions of the spring 26.

Having thus described my invention,

What I claim is:

1. A spring for cushioned seats or the like comprising an upper, horizontally corrugated seating portion, integral, rearwardly and downwardly extending yielding lever arms of different length at the front and rear ends of said seating portion for supporting same a substantial distance below the axis thereof, and forwardly extending integral means on the end portions of said lever arms for supporting said arms upon a frame and attaching said arms rigidly to said frame, the lever arm at the front end of said seating portion being of greater length than the lever arm at the rear end of said portion.

2. A spring for cushioned seats and the like comprising an upper, horizontally corrugated seating portion, an integral, rearwardly and downwardly extending, yielding lever arm of substantial length at the front end of said portion, an integral, shorter, rearwardly and downwardly extending, yielding lever arm at the rear end of said seating portion, coiled portions in said front and rear lever arms close to the lower ends thereof, and integral attaching means on the end portions of said arms angularly offset with respect to the plane of said seating portion.

3. A spring for cushioned seats or the like as described in claim 2, wherein the coiled portion at the end of said shorter lever arm is substantially stiffer than the coiled portion at the end of the longer lever arm.

4. A spring for cushioned seats or the like as described in claim 1, wherein the seating portion is substantially straight, and wherein the integral supporting means for said lever arms extend forwardly and downwardly, so as to stretch and bulge the seating portion of said spring upwardly, when the supporting means are seated upon and rigidly secured to the frame structure of a seat.

5. The combination of a spring having an upper, horizontally corrugated seating portion, an integral, rearwardly and downwardly extending, yielding lever arm of substantial length at the front end of said portion, an integral, shorter, rearwardly and downwardly extending, yielding lever arm at the rear end of said seating portion, and integral supporting means at the end portions of said arms angularly offset with respect to the plane of said seating portion, with a supporting frame structure having said integral supporting means rigidly secured thereto to place said integral lever arms under tension with respect to said seating portion, so that said integral arms carry said seating portion forwardly and downwardly and stiffen said portion by stretching same longitudinally, when a load is placed on said portion, said integral arms also yieldingly bulge said seating portion upwardly and counteract downward bulging of said portion by the load proportionate to the load.

6. As an article of manufacture and sale a cushioned seat for automobiles, upholstered furniture and the like comprising a frame, and a plurality of springs, such as described in claim 1, rigidly secured side by side crosswise of said frame, said springs having their integral seating and attaching means seated upon and attached to said frame so that a torsion is applied to the respective lever arms in a direction to effect stretching in the seating portions of said springs, bulge same upwardly and provide sufficient initial resistance of said seating portions against downward bulging.

7. A spring for cushioned seats or the like comprising an upper, horizontally corrugated seating portion, rearwardly and downwardly extending yielding lever arms of different length at the front and rear ends of said seating portion, rigidly connected thereto, for supporting same a substantial distance below the axis thereof, and means on the end portions of said lever arms, rigidly connected thereto, for attaching said arms to a frame, the lever arm at the front end of said seating portion being of greater length than the lever arm at the rear end of said portion.

8. In a seat structure for cushioned seats or the like a supporting frame and a plurality of wire springs, each of said springs comprising a horizontally corrugated seating portion, rearwardly inclined supporting means of different lengths integrally extended from the front and rear ends of said seating portion, and integral attachment means at the ends of said supporting means normally angularly related with respect to said supporting means and said seating portions, the angular relationship of said attachment means to said supporting means and said seating portions of said springs being changed from its normal position when the springs are attached to the frame for effecting axial stretching and bulging of the seating portions of the springs in the assembled seat structure.

9. A spring for cushioned seats or the like comprising an upper, horizontally corrugated seating portion, integral, rearwardly and downwardly extending yielding lever arms of different length at the front and rear ends of said seating portion for supporting same a substantial distance below the axis thereof, and integral means on the end portions of said lever arms for supporting said arms upon a frame and attaching said arms rigidly to said frame, the lever arm at the front end of said seating portion being of greater length than the lever arm at the rear end of said portion.

10. A spring for cushioned seats and the like comprising an upper, horizontally corrugated seating portion, an integral, rearwardly and downwardly extending yielding lever arm of substantial length at the front end of said portion, an integral, shorter, rearwardly and downwardly extending yielding lever arm at the rear end of said seating portion, coiled portions in said front and rear lever arms, and integral attachment means on the end portions of said arms angularly offset with respect to the plane of said seating portion.

11. A spring for cushioned seats or the like as described in claim 10, wherein the coiled portion in said shorter lever arm is substantially stiffer than the coiled portion in the longer lever arm.

12. A spring unit for seat structures or the like formed from a continuous wire comprising a corrugated seating area, rearwardly inclined yielding arms of differential length angularly related to said area and integrally extended therefrom for mounting said area on a frame structure, and attachment means on said yielding arms for rigidly attaching said arms to a frame structure, said attachment means being angularly positioned to said arms and said seating area in such a manner as to effect upward bulging and longitudinal stretching of the seating area when the attachment means are forcibly secured to a frame structure.

13. A seat structure comprising in combination a supporting frame and a spring unit secured at spaced points to said frame, said spring unit comprising a sinuous resiliently extensible body portion and integral resilient end portions rigidly attached to said frame at said spaced points, one of said end portions being rebent so that said body portion is in overlying relation with respect thereto, said last named end portion being of greater length and permitting greater relative movement between said body portion and said frame than the other of said end portions, the normal relation of said end portions to said body portion being such that when said end portions are secured at said spaced points on said frame, said body portion is both elongated and bowed with respect to its normal state with such bowing being opposed to the deflection of said body portion under a normally applied load when in use.

14. A seat structure comprising in combination a supporting frame and a spring unit secured at spaced points to said frame, said spring unit consisting of a continuous resilient metal member comprising a sinuous resiliently extensible body portion and integral end portions rigidly attached to said frame at said spaced points, one of said end portions formed of a single rebend of said metal member and being so rebent that said body portion is in overlying relation with respect thereto, said last named end portion being of greater length and permitting greater relative movement between said body portion and said frame than the other of said end portions, the normal relation of said end portions to said body portion being such that when said end portions are secured at said spaced points on said frame, said body portion is both elongated and bowed with respect to its normal state with such bowing being opposed to the deflection of said body portion under a normally applied load when in use.

MORRIS FREUND.